United States Patent
Varatharajah

(10) Patent No.: US 7,634,428 B1
(45) Date of Patent: Dec. 15, 2009

(54) ELECTRONIC SHOPPING SERVICE

(75) Inventor: Anandakumar Varatharajah, Wattala (LK)

(73) Assignee: Symbol Technologies, Inc., Holtsville, NY (US)

( * ) Notice: Subject to any disclaimer, the term of this patent is extended or adjusted under 35 U.S.C. 154(b) by 1094 days.

(21) Appl. No.: 09/663,069

(22) Filed: Sep. 15, 2000

(51) Int. Cl.
*G06Q 30/00* (2006.01)

(52) U.S. Cl. .................. 705/26; 705/1; 705/2; 705/14; 705/16; 705/17; 705/21; 705/22; 705/27; 705/65; 235/375; 235/380

(58) Field of Classification Search .............. 705/1, 705/2, 14, 16, 17, 21, 22, 26, 27, 65; 715/513; 235/375, 380
See application file for complete search history.

(56) References Cited

U.S. PATENT DOCUMENTS

| | | | | |
|---|---|---|---|---|
| 5,739,512 | A * | 4/1998 | Tognazzini | 235/380 |
| 6,185,542 | B1 * | 2/2001 | Moran et al. | 705/16 |
| 6,233,682 | B1 * | 5/2001 | Fritsch | 705/26 |
| 6,246,997 | B1 * | 6/2001 | Cybul et al. | 705/27 |
| 6,249,773 | B1 * | 6/2001 | Allard et al. | 705/26 |
| 6,327,576 | B1 * | 12/2001 | Ogasawara | 705/22 |
| 6,415,261 | B1 * | 7/2002 | Cybul et al. | 705/14 |
| 6,487,540 | B1 * | 11/2002 | Smith et al. | 705/21 |
| 6,490,602 | B1 * | 12/2002 | Kraemer | 715/513 |
| 6,533,168 | B1 * | 3/2003 | Ching | 235/375 |
| 6,543,683 | B2 * | 4/2003 | Hoffman | 235/375 |
| 6,598,026 | B1 * | 7/2003 | Ojha et al. | 705/26 |

(Continued)

FOREIGN PATENT DOCUMENTS

EP 1195706 A2 * 4/2002

(Continued)

OTHER PUBLICATIONS

"Tech Trends" (Anonymous. May 2000. Progressive Grocer).*

(Continued)

*Primary Examiner*—Yogesh C Garg

(57) ABSTRACT

Apparatus and methods for an electronic shopping service. The service enables a consumer to select line items from electronic receipts and group them as a review list. The consumer may create groups of people to have access to the review list and may assign access permissions to each of the review groups. A member of a review group may review the items in a review list and comment on the items. The comments may be directed to the consumer or to other members of the review group. The review may be off-line or on-line, as in a chat session or telephone or audiovisual conference. The consumer or a review-group member may order on-line any of the items listed in a review list. The consumer or a review-group member may add products from e-commerce sites to the review list (if so authorized). The shopping service handles the ordering. Where the items to be purchased are from multiple e-commercial sites, the shopping service places multiple orders as necessary, with shipping and payment as directed by the consumer. The shopping service may enable the consumer or a review-group member to match items from a review list for comparison. The comparison may be visual, cost-wise, etc. The service may enable a consumer to upload data to use in the item comparison. Such data may include images of the consumer or of his belongings, for example.

16 Claims, 13 Drawing Sheets

U.S. PATENT DOCUMENTS

| | | | |
|---|---|---|---|
| 6,609,106 B1 * | 8/2003 | Robertson | 705/14 |
| 6,611,814 B1 * | 8/2003 | Lee et al. | 705/26 |
| 6,738,749 B1 * | 5/2004 | Chasko | 705/17 |
| 2001/0023402 A1 * | 9/2001 | Flynn | 705/1 |
| 2003/0158819 A1 * | 8/2003 | Scott | 705/65 |
| 2005/0027611 A1 * | 2/2005 | Wharton | 705/26 |

FOREIGN PATENT DOCUMENTS

| | | | |
|---|---|---|---|
| EP | 1195728 A2 * | 4/2002 | |

OTHER PUBLICATIONS

"Not All Are Sold on Web Point of Sale Terminals" (Stock, Helen. Mar. 28, 2000. American Banker).*

"A good idea on paper" (Clark, Ken. Mar. 2000. Chain Store Age).*

"NCR: Internet Leaders Unite to Define Next Wave in E-Commerce" (M2 Presswire. Jan. 20, 2000).*

"Digital receipts could link retail stores, e-commerce" (Sporich, Brett. Jan.-Feb. 2000. Video Store Magazine).*

"E-receipts on the retail front" (Sliwa, Carol. Jan. 24, 2000. Computerworld).*

"NCR Lobbies for Digital Receipts" (Ferguson, Owen. Apr. 21, 2000. Computer Dealer News).*

"End-to-End Enterprise Solution: Extending the Reach of Retail Stores Through Point-of-Sale Web Technology" (Dec. 1999 on website http://java.sun.com/features/1999/12/atpos..html.*

Press release, "NetGift Registry Employs Broadvision to Bring Shoppers One Click Closer to the Perfect Gift"; PR Newswire, New York, Nov. 22, 1999, p. 1 extracted from Proquest database website.*

Press release, "Will Gift Lists Click?"; PR Newswire, New York, Nov. 18, 1999, p. G.21 extracted from Proquest database website.*

* cited by examiner

ELECTRONIC SHOPPING SERVICE

BACKGROUND

This invention relates to electronic commerce. More specifically, this invention relates to electronic-transaction records, depositories for such records and the use of such records in subsequent electronic transactions.

A not atypical web-based shopping experience involves a consumer going to the website of a first merchant—a toy retailer, for example—to find and purchase a first item, then navigating to a second merchant—a big-box discount retailer, for example—to find and purchase a second item, etc. The consumer pays for the first item at the checkout page of the first merchant, for the second item at the checkout page of the second merchant and for subsequent items at the checkout pages of respective merchants.

The checkout "page" of a website, however, tends to be several pages long. The process of checking out can mean filling in forms on one page after another. Where the checkout page sequence is not particularly well implemented, a mistake on one page may require the consumer to re-enter not only the information entered improperly on a form but all information on the form—even the correctly entered information. The penalties for errors are multiplied where a consumer visits multiple websites in a shopping excursion.

Accordingly, the art seeks a shopping service that simplifies the shopping process for a consumer that shops at multiple websites.

These and other goals of the invention will be readily apparent to one of skill in the art on reading the background above and the description below.

SUMMARY

Herein are described apparatus and methods for an electronic shopping service. The service enables a consumer to select line items from electronic receipts and group them as a review list. The consumer may create groups of people to have access to the review list and may assign access permissions to each of the review groups.

A member of a review group may review the items in a review list and comment on the items. The comments may be directed to the consumer or to other members of the review group. The review may be off-line or on-line, as in a chat session or telephone or audiovisual conference.

The consumer or a review-group member may order on-line any of the items listed in a review list. The consumer or a review-group member may add products from e-commerce sites to the review list (if so authorized).

The shopping service handles the ordering. Where the items to be purchased are from multiple e-commercial sites, the shopping service places multiple orders as necessary, with shipping and payment as directed by the consumer.

The shopping service may enable the consumer or a review-group member to match items from a review list for comparison. The comparison may be visual, cost-wise, etc.

The service may enable a consumer to upload data to use in the item comparison. Such data may include images of the consumer or of his belongings, for example.

DESCRIPTION OF SPECIFIC EMBODIMENTS

Overview

Figure 1:
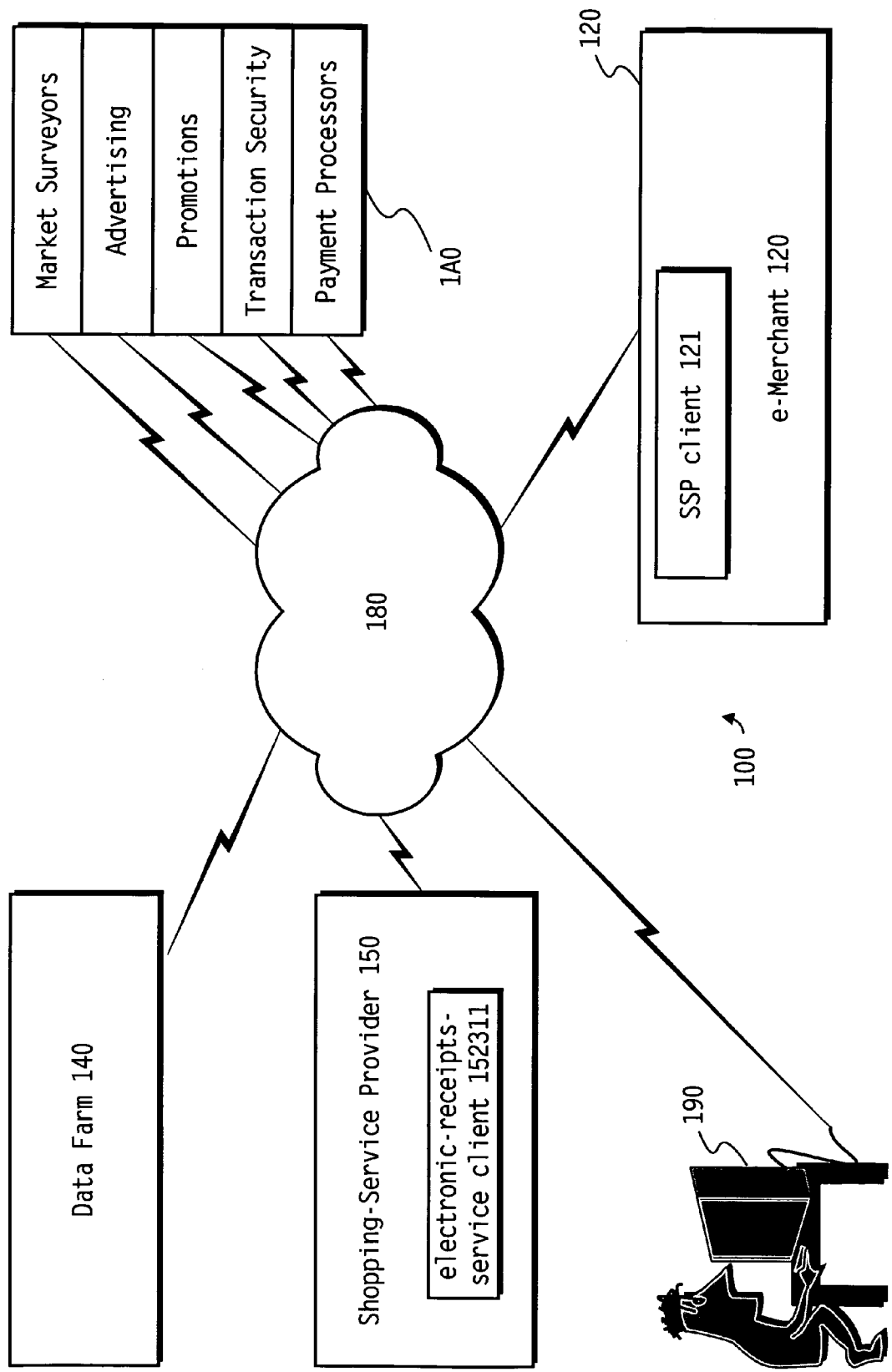
FIG. 1 is a diagram illustrating an electronic shopping system incorporating one embodiment of the invention.

FIG. 1 is a diagram illustrating an electronic shopping system 100 incorporating one embodiment of the invention. The system 100 includes one or more e-merchants 120, one or more data farms 140, one or more shopping-service providers (SSPs) 150, one or more personal computers 190 and optional application service providers (ASPs) 1A0. The system 100 also includes a communications links 180.

The communications link 180 communicatively interconnects the e-merchants 120, data farms 140, SSPs 150, personal computers 190 and ASPs 1A0. Where the link 180 is an internet, the e-merchants 120, data farms 140, personal computers 190 and ASPs are each a host on the internet 180, allowing any one to communicate with any other one through that internet 180. (Any number of these "hosts" may be only nominally so, their actual status more likely to depend on the directness of their connection to that internet 180—through optional service providers not shown, for example.)

An e-merchant 120 may be a retail website on the worldwide web. Using conventional web and internet protocols, a consumer at a personal (or other) computer 190 transacts business at an e-merchant 120. The consumer typically thereby creates a record of that transaction.

A data farm 140 provides an electronic-receipts repository for receiving and storing that transaction record. The data farm may provide an electronic-receipts service for manipulating that transaction record, including retrieving and forwarding it on demand.

The optional application providers 1A0 support the transactions of an e-merchant 120. For example, an ASP 1A0 may verify credit or debit cards or may authorize credit- or debit-card transactions.

Figure 3:
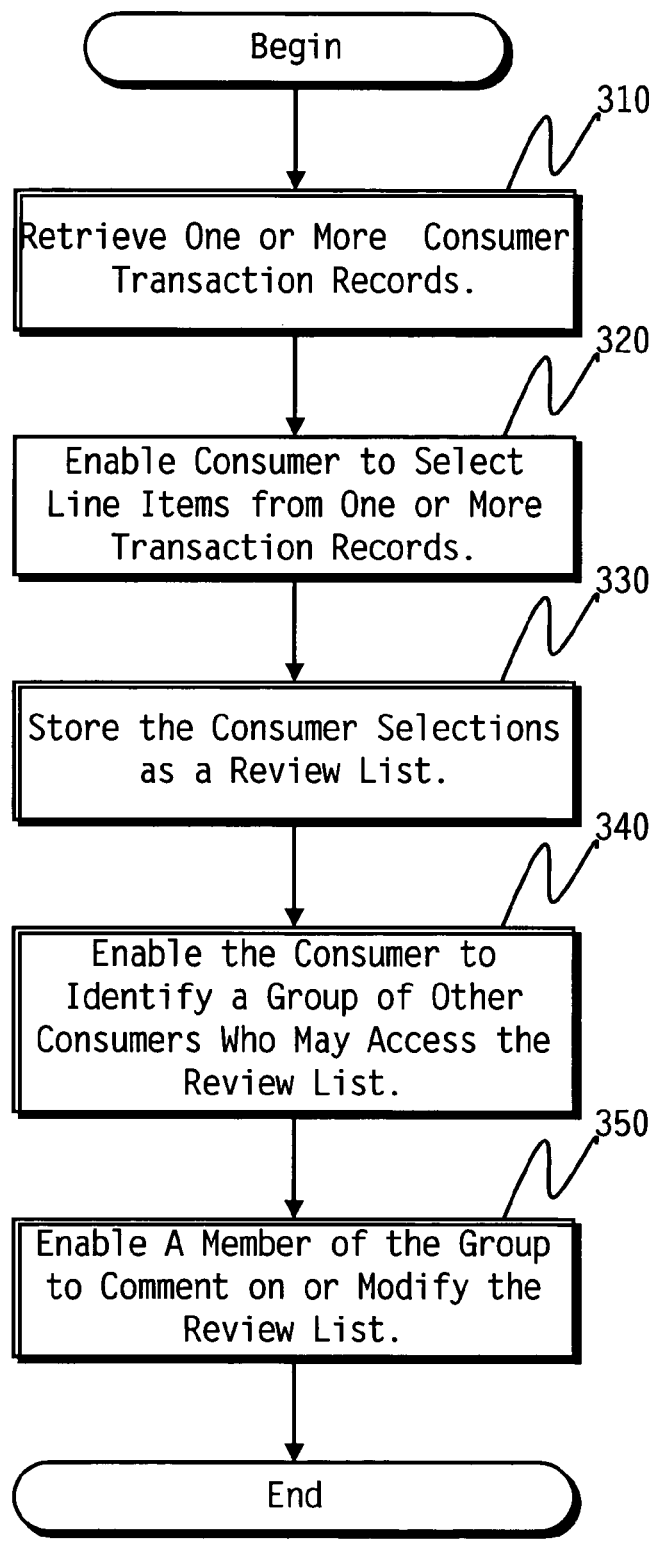
FIG. 3 illustrates the process a shopping-service provider may follow to enable product review.
Figure 4A:
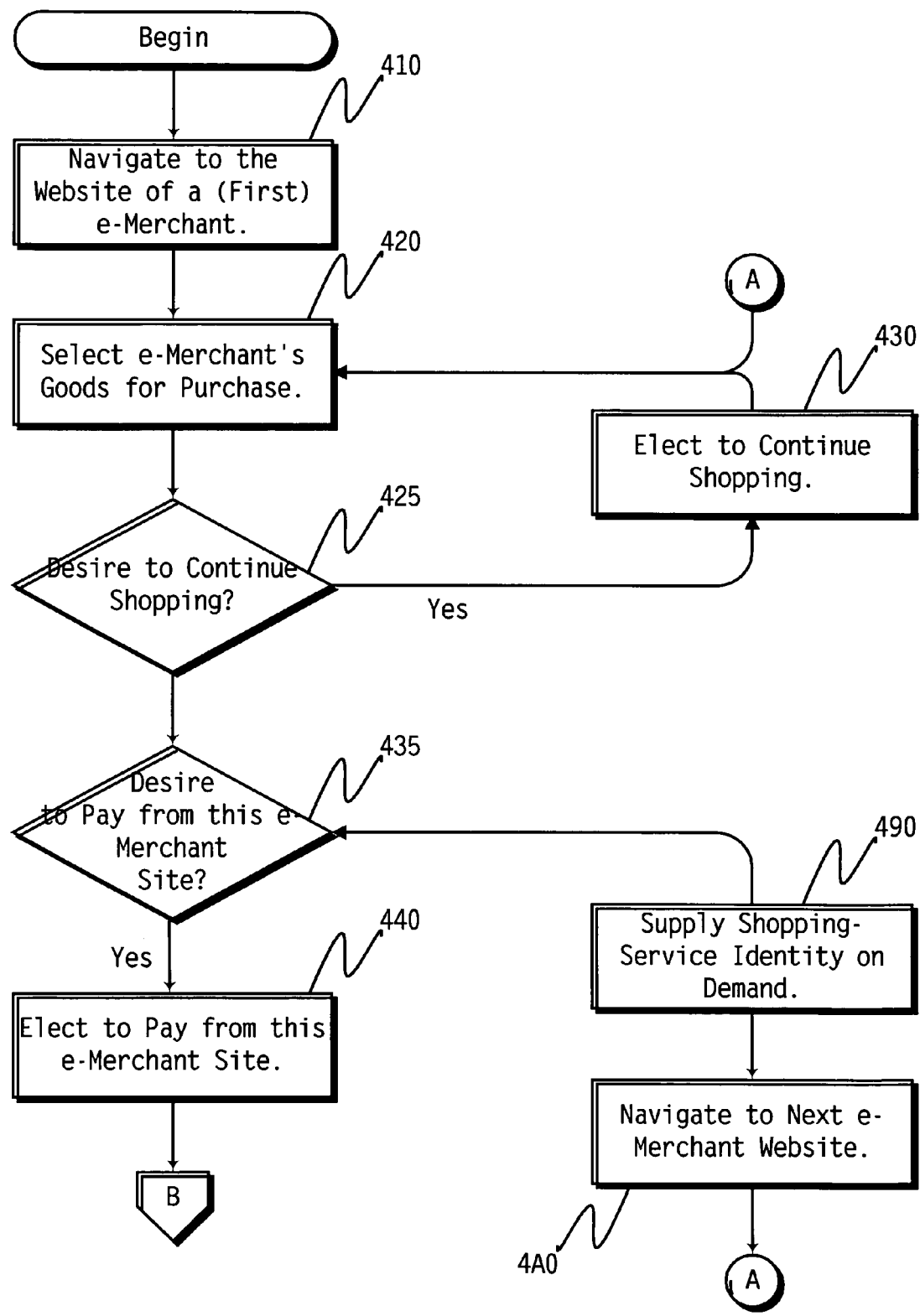
FIGS. 4A-4B and 5A-5B illustrate parallel processes that a consumer and an e-merchant may respectively perform.
Figure 4B:
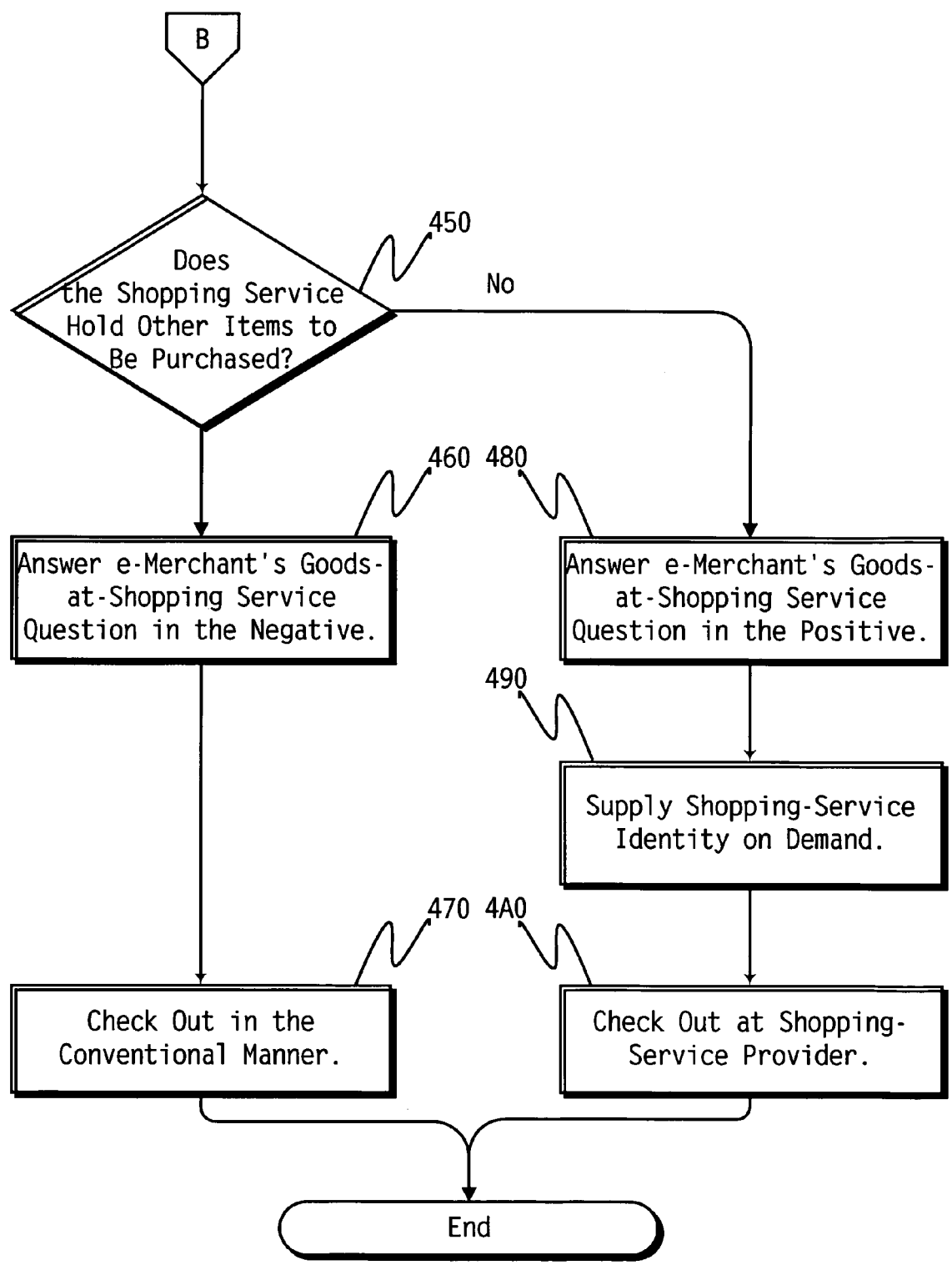
Figure 5A:
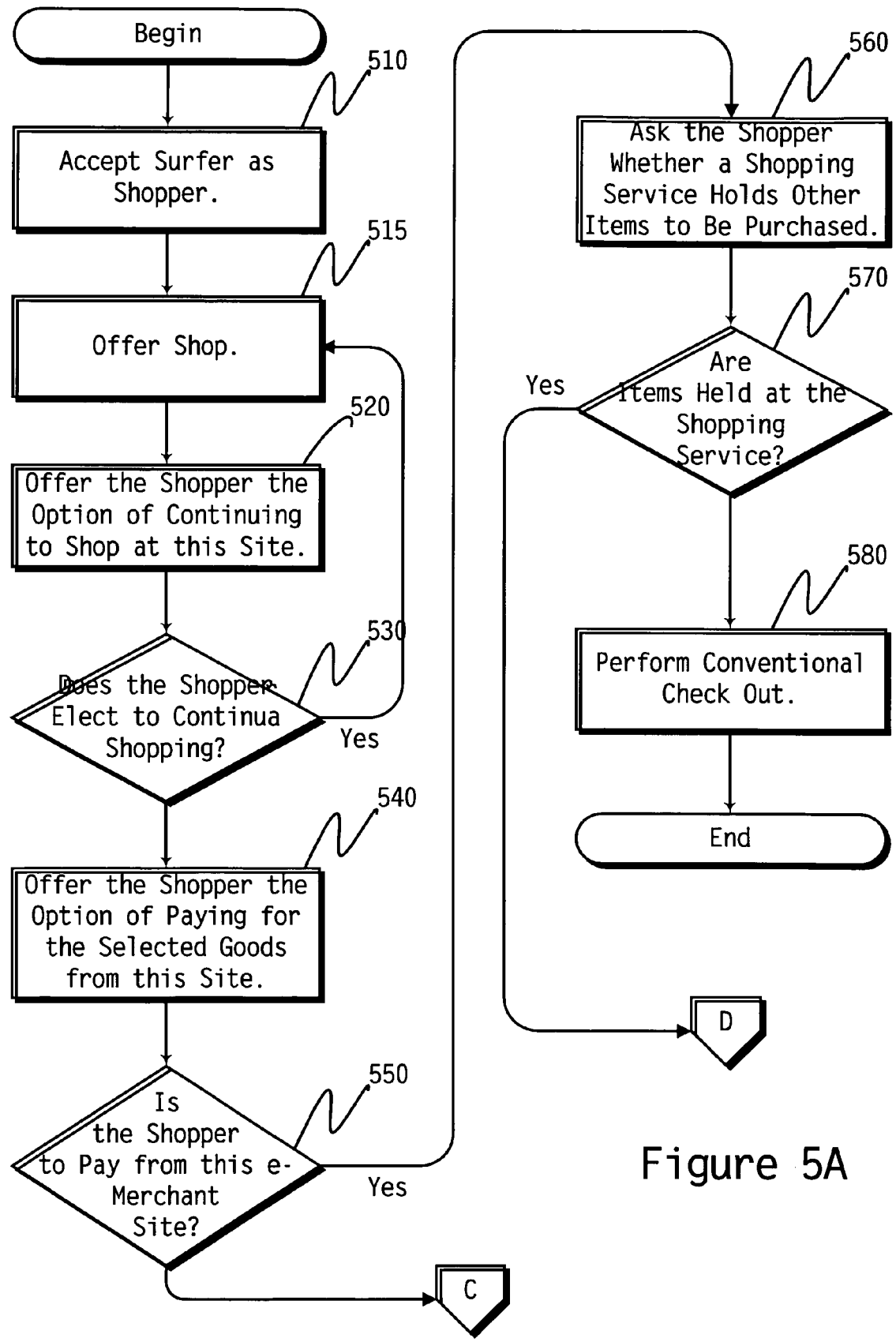
Figure 5B:
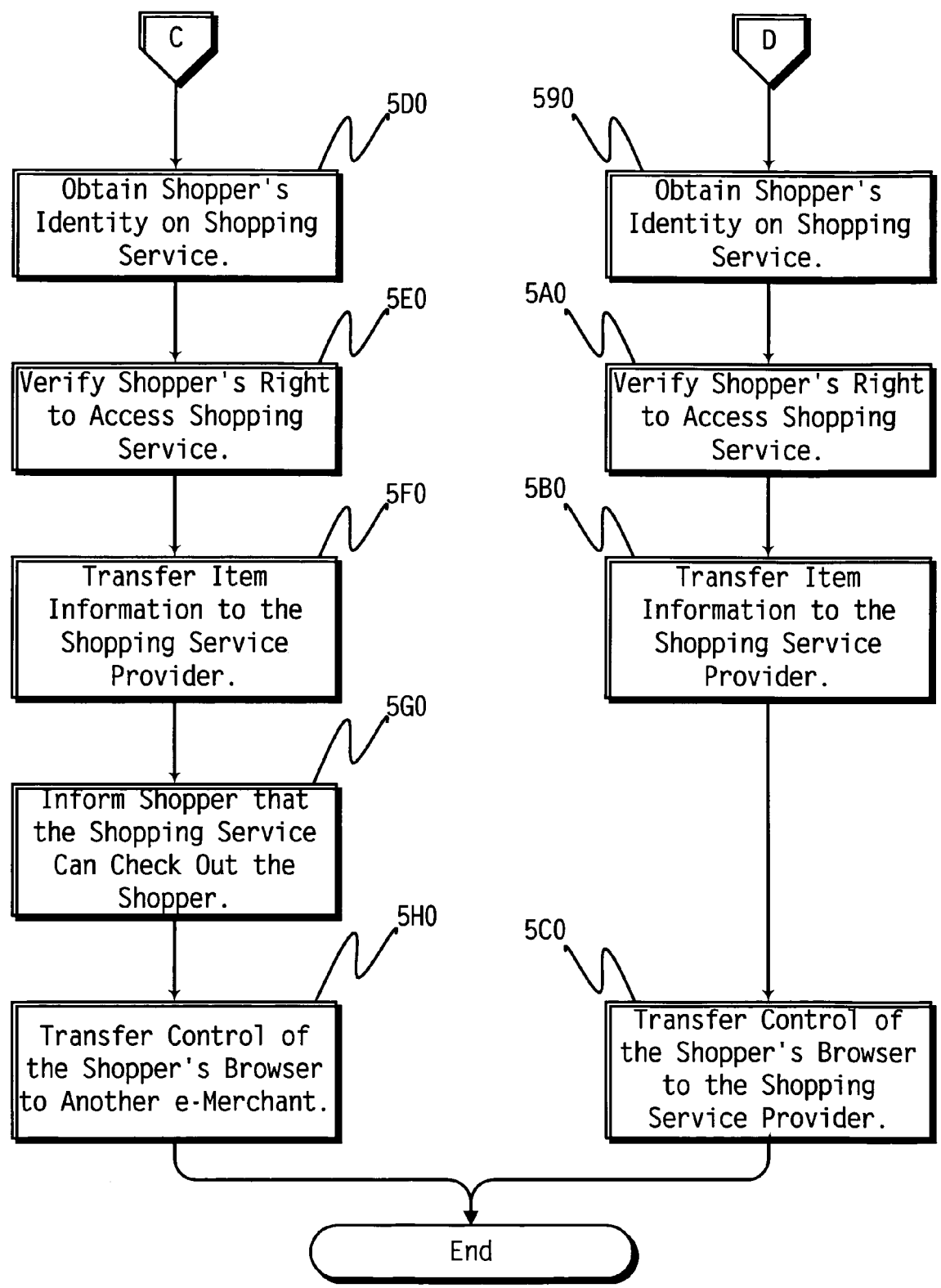
Figure 6A:
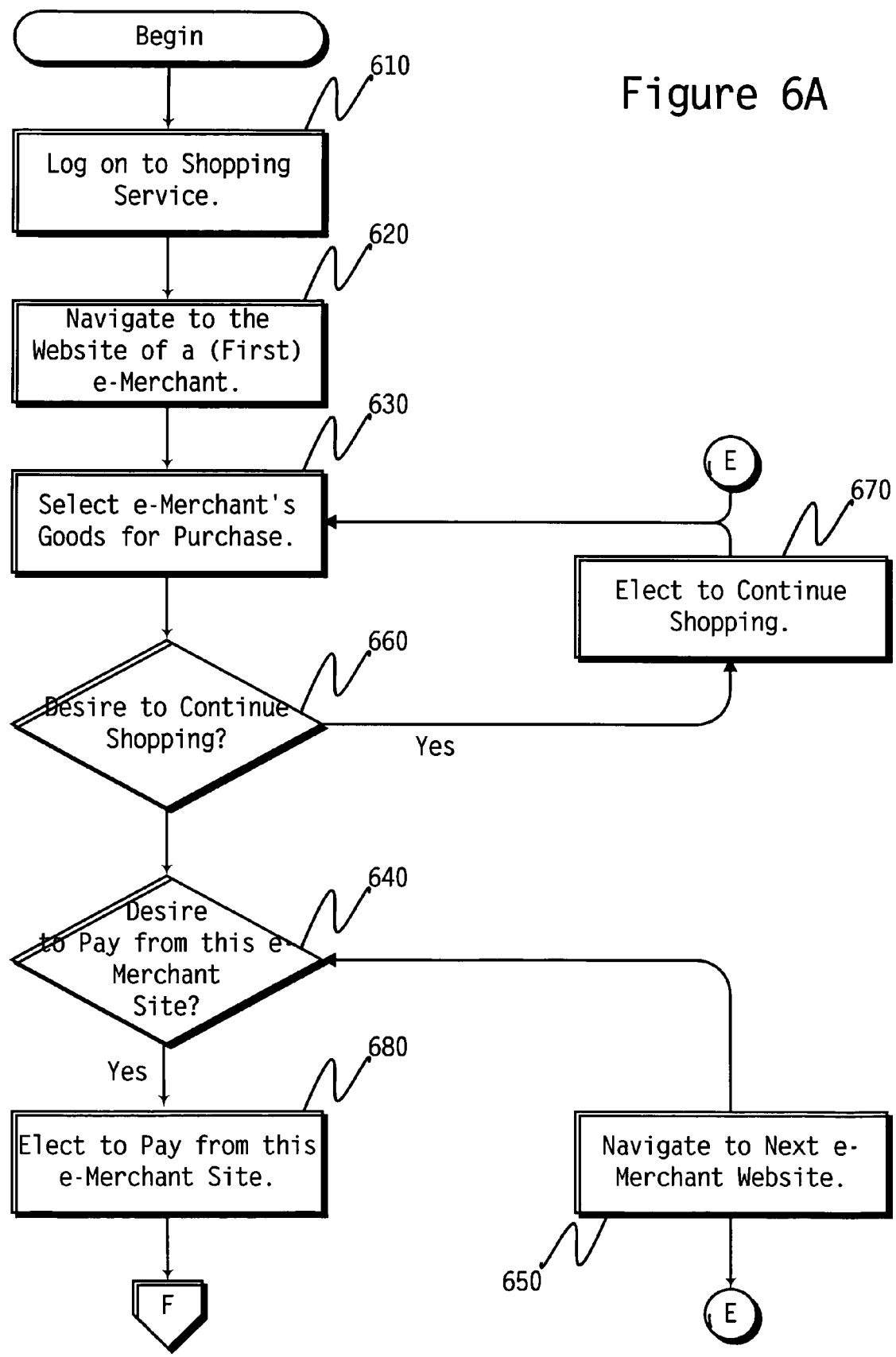
FIGS. 6A-6B and 7A-7B illustrate parallel processes that a consumer and an electronic shopping system may respectively perform.
Figure 6B:
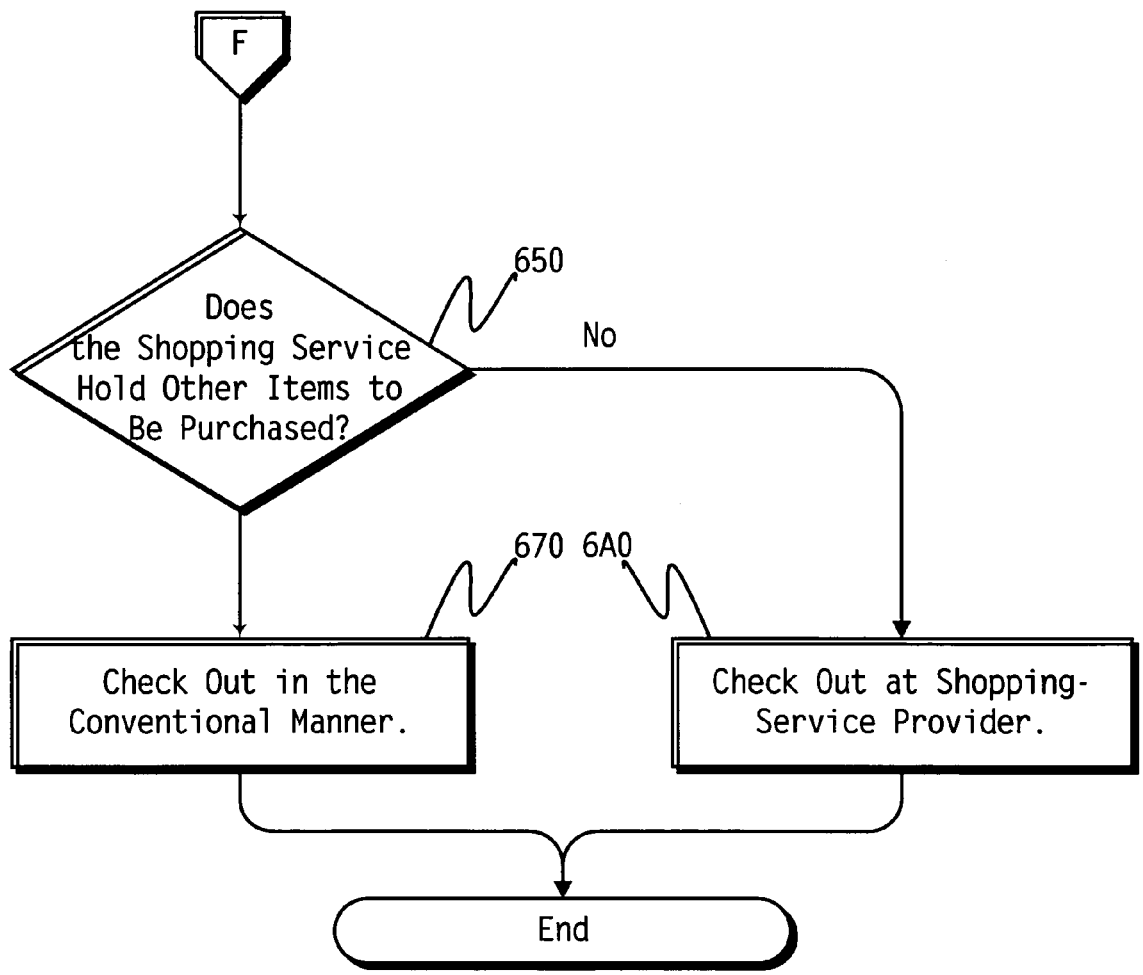
Figure 7A:
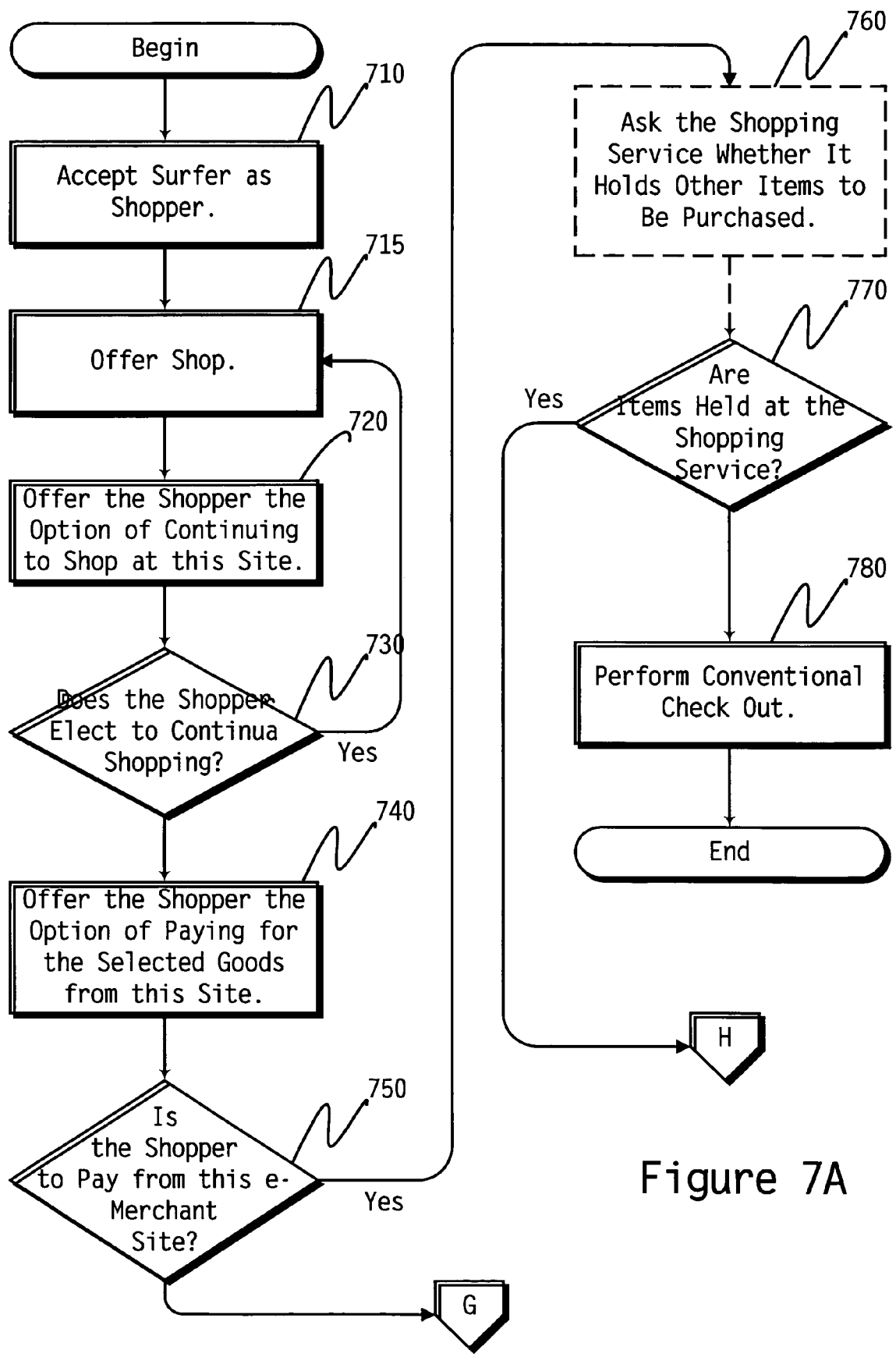
Figure 7B:
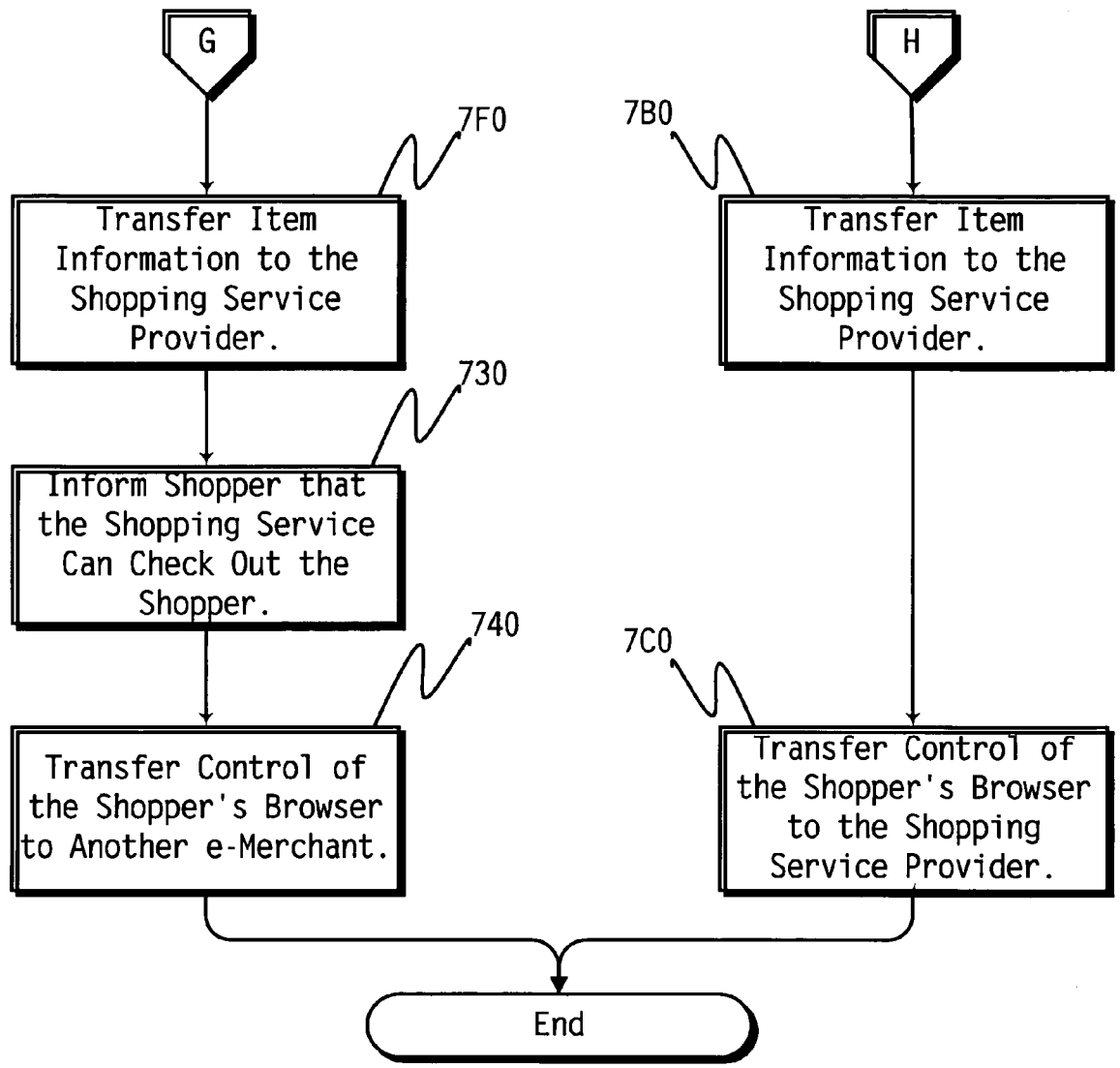

A shopping-service provider (SSP) 150 cooperates with e-merchants 120, data farms 140 and computers 190 to provide shopping services described herein. FIG. 3 illustrates the process an SSP 150 may follow to enable product review.

For example, under direction of a consumer at a computer 190, the SSP 150 may retrieve some of the consumer's transaction records from data farms 140, step 310, and enable the consumer to select line items from those transaction records, step 320, thereby creating a review list, step 330. The SSP 150 may also enable the consumer to identify a group of other consumers who may access—and even modify—his list.

Figure 2:
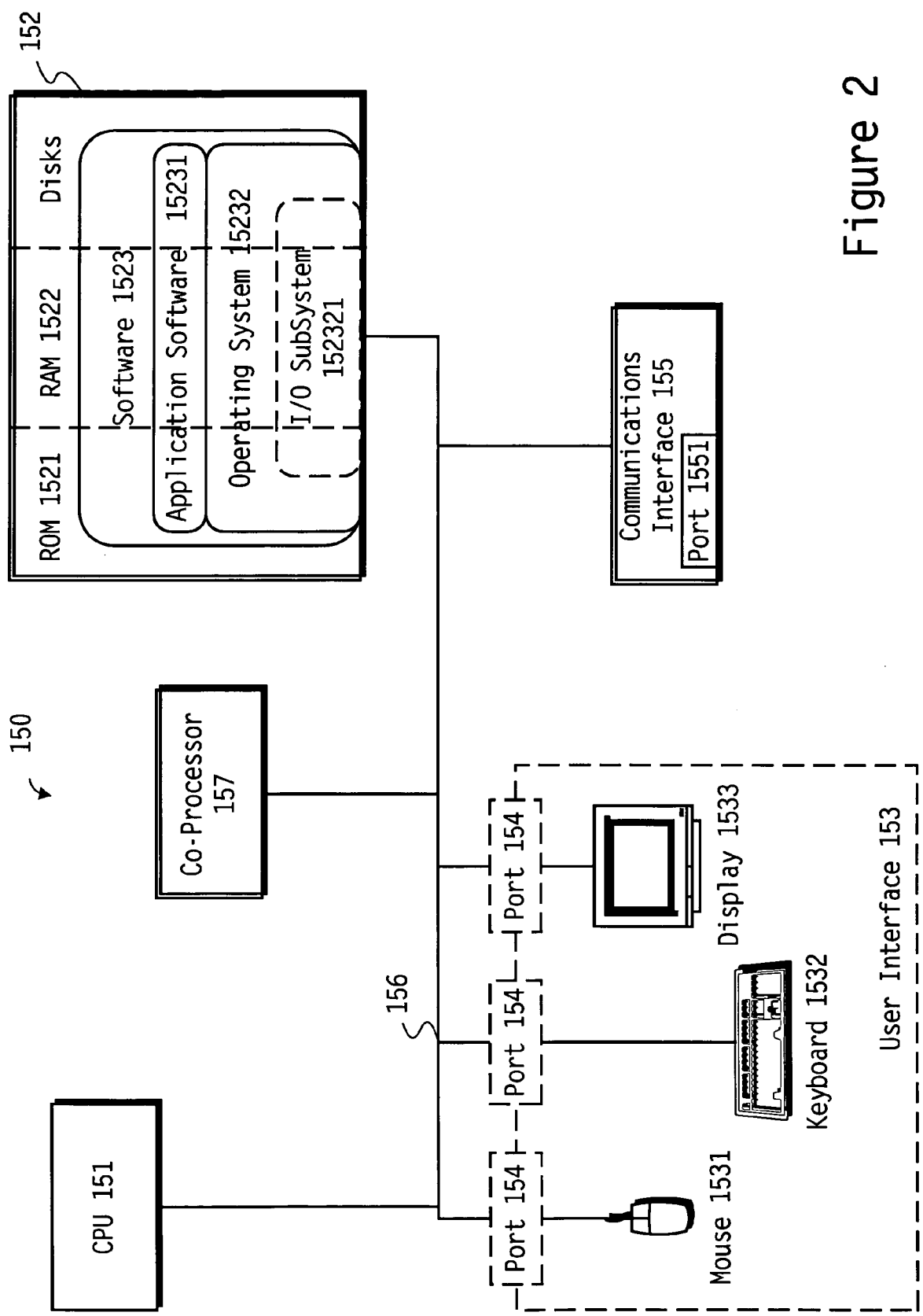
FIG. 2 schematically illustrates the SSP of FIG. 1, according to one embodiment of the invention.

FIG. 2 schematically illustrates an SSP 150, according to one embodiment of the invention. The SSP 150 may include one or more of the following: a central processing unit ("CPU") 151, a memory 152, a user interface 153, a port 154, a communications interface 155 and an internal bus 156. The bus 156 communicatively connects the CPU 151, the memory 152, the user interface 153, the port 154 and the communications interface 155.

(Of course, in an embedded system, some of these components may be missing, as is well understood in the art of embedded systems. In a distributed computing environment, some of these components may be on separate physical machines, as is well understood in the art of distributed computing.)

The memory 152 includes high-speed, volatile random-access memory (RAM) 1522, as well as non-volatile memory such as read-only memory (ROM) 1521 and magnetic disk drives. Further, the memory 152 contains software 1523. The software 1523 is layered: Application software 15231 communicates with the operating system 15232, and the operating system 15232 communicates with its I/O subsystem 152321. The I/O subsystem 152321 communicates with the CPU 151, the user interface 153 and the communications interface 155 by means of the communications bus 156.

The memory 152 may be programmed according to the shopping services described herein. Likewise, where the emerchant 120, the data farm 140, the computer 190 or ASP 1A0 is (fully or partially) implemented by a computer system, the memory of that computer system may be programmed according to the shopping services described herein.

An e-merchant 120 may be a retail website on the worldwide web. The hardware and software enabling an e-merchant are notorious in the art and not described herein. The e-merchant 120 includes a shopping-service software client 121, corresponding to and cooperating with an SSP 150.

A data farm 140 may be an electronic-receipts repository, along with an electronic-receipts service. Scott et al., U.S. patent application Ser. No. 09/480,883, entitled, "An Electronic-Receipts Service," filed Jan. 10, 2000, and commonly assigned to ReceiptCity.com, San Jose, Calif., describes one such electronic-receipts repository and service. (Scott et al. is incorporated herein by reference.) The website www.ReceiptCity.com, made available by the assignee of the instant application, is another example of an electronic-receipts repository and service.

A computer 190 may include a web browser 191 or other software 191 for communicating with the e-merchants 120, data farms 140 and SSPs 150 over the link 180. The software 191 may include an SSP client 192 and an electronic-receipts-service client 193.

Shopping Services

Multi-Merchant Purchasing

In one embodiment, once e-merchants 120α have each installed a shopping-service client 121, a consumer may navigate to the website of a first e-merchant 120a, step 410. FIGS. 4A-4B and 5A-5B illustrate parallel processes that a consumer and an e-merchant may respectively perform.

The consumer may peruse that e-merchant 120a's goods and select one or more for purchase, step 420. The e-merchant 120a may offer the consumer the option of continuing to shop at this e-merchant site 120a, step 520, proceeding to checkout (including paying for the selected goods at this e-merchant site 120a), step 540, or continuing to shop—but at another e-merchant site 120b—and paying for goods selected at this e-merchant site 120a at the other e-merchant site 120b, steps 5D0 through 5H0.

The first option is currently available and well known in the art of web retailing. Accordingly, the option of continuing to shop at the current e-merchant 120a is not described further herein.

Regarding the second option, along the way to payment, the e-merchant 120a may ask the consumer whether a shopping service 150 currently holds other items to be purchased, step 560. If the consumer answers in the negative, step 570, the SSP 150 may check out the consumer in the conventional manner—without further reference to the shopping service 150, step 580. This check-out procedure is also well known in the art of web retailing and is not described further herein.

If the consumer answers in the positive, step 570, the e-merchant 120a may query the consumer for his shopping-service identity and, possibly, an authenticator (a user identifier and corresponding password, for example), step 590. The e-merchant 120a (more precisely, the e-merchant SSP client 121) may then query the SSP 150 to verify the user identifier and authenticate the consumer's right to access that user's account, step 5A0. On verification and authentication, the e-merchant 120a may transfer line-item information as necessary to the SSP 150, step 60 (for the SSP 150 later to order the consumer-selected goods on the e-merchant 120a or for the SSP 150 later to get more information about any of the consumer-selected goods from the e-merchant 120a, for example). The e-merchant 120a transfers the shopper to the SSP 150, step 5C0. The SSP 150 may complete the check out of the consumer, including the goods selected from the first and any other e-merchants 120.

(In an alternate embodiment, the SSP client 121 of an e-merchant 120 may be sufficiently intelligent to receive line-item information from the SSP 150 and to check out the consumer using the resources of the e-merchant 120 rather than those of the SSP 150.)

If, however, the consumer chooses the option of continuing to shop at a different e-merchant 120b, step 550, the e-merchant 120a may ask for a shopping-service identity and, possibly, an authenticator, step 5D0. The e-merchant 120 may then query the SSP 150 to verify the user identity and authenticate the consumer's right to access that user's account, step 5E0. On verification and authentication, the e-merchant 120 may transmit line-item information for the selected e-merchant 120a goods to the SSP 150, step 5F0. On successful transmission, the SSP 150 may inform the consumer that the SSP 150 has the selected-goods line-item information and that the SSP 150 or any merchant 120α will check out the consumer at the end of his shopping, step 5G0. The consumer may then navigate (including being referred) to the second e-merchant 120b website, step 5H0.

Alternatively, the consumer may directly log on to an SSP 150, step 610, providing his shopping-service identity. (FIGS. 6A-6B and 7A-7B illustrate parallel processes that a consumer and an electronic shopping system may respectively perform.) From there, the consumer may navigate to the first e-merchant 120a's website, step 620, select goods for purchase, step _4B30, opt to continue shopping at a second e-merchant 120b, step 640, navigate to that second e-merchant 120's website, step 650, and select goods at the e-merchant 120b website for purchase, step 660. In this alternative scenario, the consumer may navigate from e-merchant 120 to e-merchant 120 without re-entering a shopping-service identifier and corresponding authenticator. The SSP 150 may provide this information on referring the consumer to the first merchant 120a, step 620. The SSP 150 or the e-merchant 120a may provide the information on referring the consumer to the second e-merchant 120b, step 630 or step 5H0.

On either approach to the second e-merchant 120b website, on check out, the second e-merchant 120b website offers the consumer the same options as did the first: continuing to shop at this e-merchant site 120b, step 520 or step 720, proceeding to checkout from this e-merchant site 120b, step 540 or step 740, or continuing to shop at another e-merchant site 120α, paying for the selected goods at this other e-merchant site 120α.

Where the e-merchant 120 knows the consumer's shopping-service identifier and corresponding authenticator, it need not query the user about what information the SSP 150 is maintaining on behalf of the consumer. The knowledgeable e-merchant 120 may query the SSP 150 directly for that information, step 760, or the SSP 150 may have transferred that information (along with the service identifier, for example) when referring the consumer. On learning that the SSP 150 holds information regarding goods selected from other e-merchants 120α, the e-merchant 120b transfers line-item information as necessary to the SSP 150, step 7B0. The e-merchant 120 transfers the shopper to the SSP 150, step 7C0. The SSP 150 completes the check out of the consumer, including the goods selected from the first and second e-merchants 120.

Where the SSP 150 does not hold information regarding goods selected from another e-merchant 120α, the e-merchant 120b may itself complete the check out of the consumer, step 780.

Product Review

Once an e-merchant 120α has installed an electronic-receipts-service client 122, a consumer may navigate to a website 120α and purchase goods from that website 120α. The e-merchant 120α may forward a record of that transaction to an electronic-records service 140. Alternatively, a consumer may direct the SSP 150 to retrieve that transaction record for manipulation on the SSP 150 as described herein.

The SSP 150 may then present details of the transaction record to the consumer, allowing the consumer to select one or more line items from the transaction record as a review list. The SSP 150 may allow the consumer to specify the level of detail with which the items composing the review list are listed.

The SSP may also allow the consumer to associate a review group of one or more SSP user identities with the review list, step 340. The consumer associated with one of the SSP identifies will thus have the consumer's permission to access the review list. The reviewing SSP users may comment on the list individually or in a group setting such as a chat session, step 350. The comments may be text, audio or audiovisual.

Alternate embodiments include the following: The consumer may direct the electronic-records service 140 to forward that transaction record to the SSP 150. The SSP 150 may present multiple transaction records and allow the consumer to select one or more line items from each of the multiple transaction records to form one review list. The SSP 150 may allow the consumer to specify the level of detail with which an individual item on the review list is listed.

Product Ordering

Figure 8:
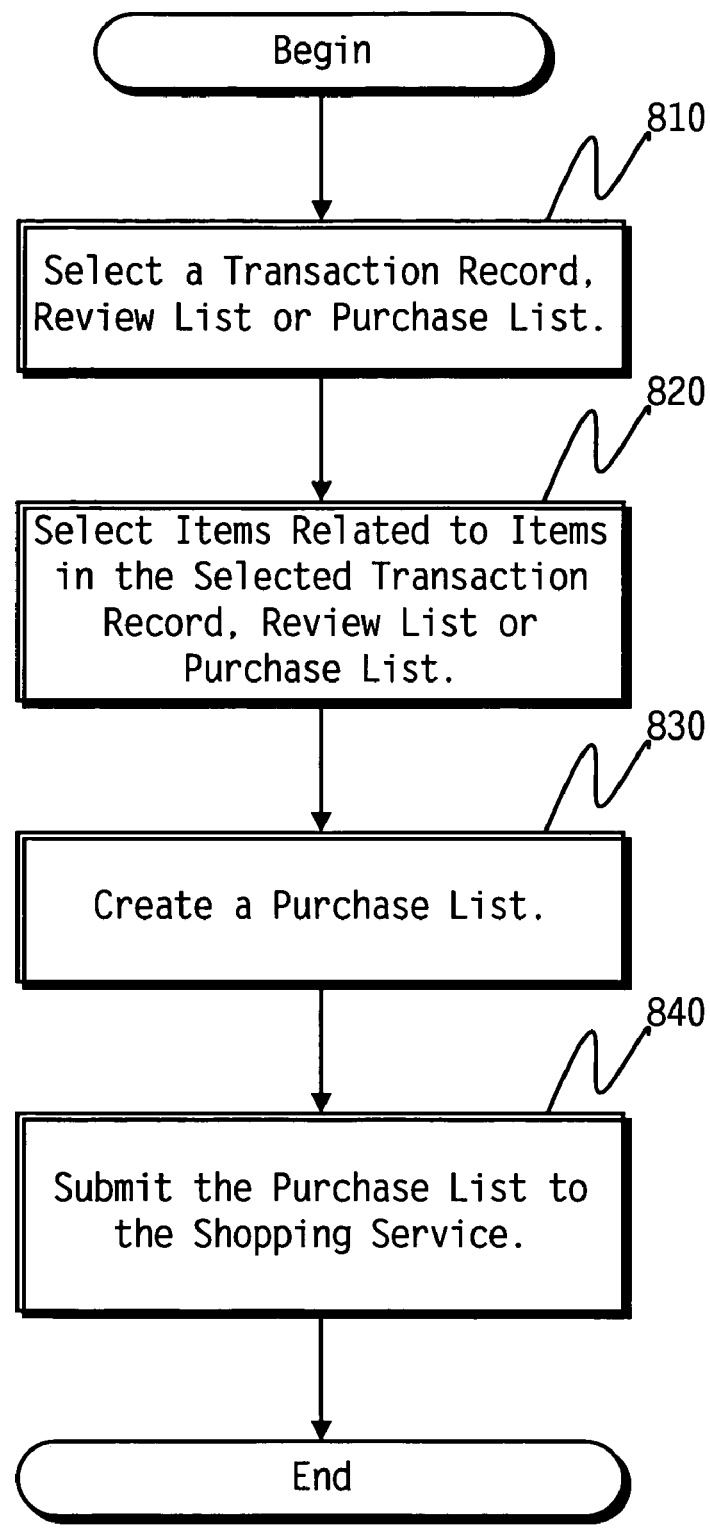
FIGS. 8 and 9 illustrate parallel processes that a consumer and a shopping-service provider may respectively follow to enable product ordering.
Figure 9:
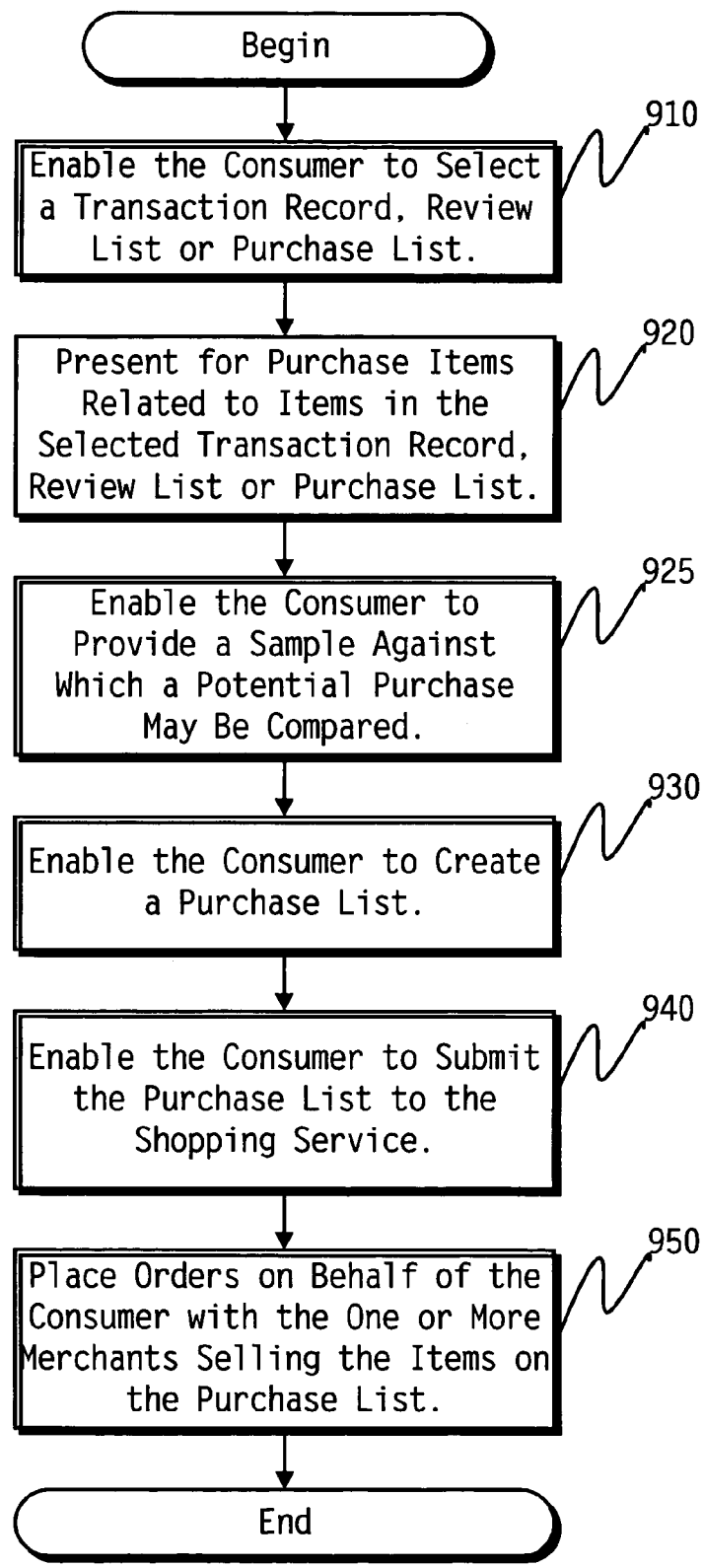

FIGS. 8 and 9 illustrate parallel processes that a consumer and a shopping-service provider may respectively follow to enable product ordering. A consumer may have access to a list of one or more products from a transaction record for a single- or multi-merchant purchase he transacted. The consumer may have access to a list of one or more products from a review list that he has created or to which he has been given access. At step 830, the consumer may use a transaction record or a review list as a purchase list for initiating a purchase transaction, or the consumer may create a purchase list: A consumer may create a purchase list by selecting line items from one or more transaction records, from one or more review lists or from a combination of one or more transactions records and one or more review lists.

The SSP 150 may offer for purchase items related to items on a transaction record, review list or purchase list, step 910. For example, where a transaction record lists a portable MP3 player, the SSP 150 may offer to include on a purchase list batteries, upgrade headphones or expansion memory for that particular MP3 player—even though or because these items may not have appeared on the transaction record. Likewise, where a transaction record includes a Mattel Corp. Barbie® doll, the SSP 150 may offer any or all of the accessories for that particular model of Barbie® doll. The SSP 150 may offer a companion product (the Ken doll, for example), a product from the same company (Learning Company software, for example) or a product from a partnership, alliance or otherwise affiliated company, etc.

The consumer may indicate to the SSP 150 that he has completed his purchase list and submit that purchase list to the SSP 150, step 840. On behalf of the consumer, the SSP 150 then places one or more orders with the one or e-merchants selling the corresponding items on the purchase list, step 950. The payment method may be identical for all of the orders or may vary across the orders, at the consumer's discretion. The order(s) may be placed immediately, or all or some may be deferred, again at the consumer's discretion.

Product Comparison

Given an item in a transaction record, review list or purchase list, the shopping service may offer one or more substitute goods to the consumer for purchase, step 920. The shopping service may offer substitutes unbidden or at the direction of the consumer.

The substitute item may be from the same manufacturer but, for example, an upgrade or downgrade model. The substitute item may be from a competing manufacturer.

The shopping service may offer samples of the substitute item and of the original item, permitting a comparison of the two, step 920. The samples may be images, sounds, smells, etc.

An SSP user may himself provide a sample against which a potential purchase may be compared, step 925. The consumer may upload an image of their body, car interior, living room, etc. This enables, for example, the consumer to test products like clothes, hats, sunglasses and shoes with the virtual body, seat covers with the virtual car interior and wall papers with the virtual living room. The shopping service may permit samples of the original and substitute items to be presented simultaneously and, where appropriate, side by side.

For a sophisticated system for presenting virtual products, see Bunn et al., U.S. patent application Ser. No. 09/615,363, entitled, "A Virtual-Product Presentation System," filed Jul. 13, 2000, and assigned to @POS.COM, INC., San Jose, Calif. Bunn et al., U.S. patent application Ser. No. 09/615,363 is incorporated herein by reference.

The shopping service may compare the line item to other similar items based on price, step 920. Indeed, the shopping service may aggregate orders from multiple consumers for a given item in order to create a bulk order and thereby receive a discount for the items, step 950. The service may not pass on the entire discount to the consumers.

Indeed, the invention now being fully described, many changes and modifications that can be made thereto without departing from the spirit or scope of the appended claims will be apparent to one of ordinary skill in the art. For example, the electronic-receipts service 140 and the SSP 150 may, of course, be combined into one service.

As another example, the consumer may add items to his purchase list that were not in a transaction record or review list and not offered by the SSP 150, step 930. A consumer may add items to a review list where the creator of the review list has given him that permission (or he himself is the creator), step 350.

As still another example, the service may provide advertisements, promotions, surveys coupons and other marketing material to the SSP client 192 for display on a consumer's computer 190. The service may target the marketing material to the particular consumer.

This specification incorporates by reference all publications and patent applications mentioned herein, to the same extent if the specification had specifically and individually incorporated by reference each such individual publication or patent application.

What is claimed is:

1. A method for manipulating receipt data, the method comprising:
    receiving, on a user computing device, a user selection of a first line item from a first electronic receipt stored on a remotely located data farm, thereby forming an electronic list, wherein the first electronic receipt includes a record of a first purchase transaction;
    transmitting the selection to the data farm;
    storing the list on the data farm after the selection is made; and
    receiving a user authorization for a group of people to remotely review the list, the reviewing performed using at least one remote computing device.

2. The method of claim 1, further comprising the step of reviewing the list, the reviewing performed by one of the group of people.

3. The method of claim 2, further comprising the step of receiving, at one of a consumer and a shopping-service coupled to the data farm, an order selection from the one of the group of people for the first line item.

4. The method of claim 2, wherein the step of reviewing comprises viewing and commenting on the list.

5. The method of claim 1, further comprising the step of receiving, on the user computing device, a user selection of a second line item from the first electronic receipt and adding that second line item to the list.

6. The method of claim 1, further comprising the step of receiving, on the user computing device, a user selection of a second line item from a second electronic receipt, wherein the second electronic receipt includes a record of a second purchase transaction, and adding that second line item to the list.

7. A method according to claim 6, further comprising:
    generating the first electronic receipt as a result of a first purchase transaction at a first merchant; and
    generating the second electronic receipt as a result of a second purchase transaction at a second merchant.

8. A method for purchasing goods, including services, from multiple merchants, the method comprising:
    receiving, on a user computing device, a user's selections of first and second goods for purchase on respective first and second websites;
    receiving payment for the first and second goods through the second website with one transaction from the user's perspective;
    generating an electronic receipt for the transaction, the receipt including a line item corresponding to a purchase record for each of the first and second goods; and
    storing the electronic receipt in a remote database for later retrieval, wherein the user may select the line items using the user computing device and then store the selection in the remote database, thereby authorizing a group of users to retrieve the line items, the retrieval performed using at least one remote computing device.

9. The method of claim 8, wherein the step of paying comprises automatically placing first and second orders for the first and second goods with the respective first and second websites.

10. The method of claim 9, further comprising the step of retrieving, using the user computing device, the electronic receipt.

11. The method of claim 9, further comprising the step of presenting an advertisement on the user computing device during the step of paying.

12. A method according to claim 1, further comprising:
    generating the first electronic receipt as a result of a first purchase transaction at a first merchant.

13. A system for manipulating receipt data, the system comprising:
    a first e-merchant stored in a first computing device and operable to generate an electronic receipt, wherein the electronic receipt includes a record of a first purchase transaction;
    a data farm stored in a memory coupled to the first e-merchant and configured to store the electronic receipt; and
    a shopping service stored in a second computing device coupled to the data farm and configured to retrieve the electronic receipt for a consumer and allow the consumer to remotely select a line item from the transaction record, thereby creating a review list stored on the data farm after the selection is made, wherein the shopping service enables the consumer to authorize one of a group of people to remotely review the list, the reviewing performed using at least one remote computing device.

14. A system for manipulating receipt data according to claim 13, further comprising:
    a second e-merchant stored in a third computing device coupled to the data farm and operable to generate a second electronic receipt, wherein the second electronic receipt includes a record of a second purchase transaction, the data farm further configured to store the second electronic receipt; and the shopping service further operable to retrieve the first and second electronic receipts.

15. A computer program product for manipulating receipt data comprising a computer readable memory and a program module, the program module including instructions directing a processor to:
    select a first line item from a first electronic receipt, wherein the first electronic receipt includes a record of a purchase transaction;
    store the selected first line item in a remote storage location after the selection is made, to form a list; and
    receive a user authorization for a group of people to remotely review the list, the reviewing performed using at least one remote computing device.

16. A computer program product according to claim 15, wherein the program module further includes instructions directing a processor to:
    receive a user selection of a second line item from a second electronic receipt, wherein the second electronic receipt includes a record of a purchase transaction, and adding that second line item to the list.

* * * * *